United States Patent
Altena et al.

(10) Patent No.: US 6,312,584 B1
(45) Date of Patent: *Nov. 6, 2001

(54) METHOD AND APPARATUS FOR ELECTROCHEMICALLY MACHINING A WORKPIECE

(75) Inventors: Hermanus S. J. Altena, Drachten (NL); Anjali K. De Silva, Glasgow (GB)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,077

(22) Filed: Jan. 12, 1999

(30) Foreign Application Priority Data

Jan. 12, 1998 (EP) .................................................. 98300162

(51) Int. Cl.[7] .............................. B23H 3/02; B23H 7/16; B23H 7/18; B23H 1/02; C25F 7/00
(52) U.S. Cl. .......................... 205/644; 205/645; 205/652; 204/224 M; 204/228.1; 204/229.8; 204/230.4; 219/69.16; 219/69.19
(58) Field of Search ...................................... 205/641–645, 205/652; 204/224 M, 230.4, 229.8, 228.1; 219/69.16, 69.19

(56) References Cited

U.S. PATENT DOCUMENTS

| | | | |
|---|---|---|---|
| 3,533,927 | * 10/1970 | Manning | 205/644 |
| 3,548,257 | * 12/1970 | Drushel et al. | 205/644 X |
| 3,627,667 | * 12/1971 | Plofsky | 205/645 X |
| 3,714,005 | * 1/1973 | Drushel | 205/644 |
| 3,761,366 | * 9/1973 | Drushel | 205/645 |
| 4,205,212 | * 5/1980 | Ullmann et al. | 219/69.12 |
| 4,346,278 | * 8/1982 | Bhattacharyya et al. | 219/69.17 |
| 4,443,680 | * 4/1984 | El-Menshawy et al. | 219/69.13 |
| 5,004,528 | * 4/1991 | England | 205/644 |
| 5,496,984 | * 3/1996 | Goto et al. | 219/69.18 |

FOREIGN PATENT DOCUMENTS

| | | |
|---|---|---|
| 2095153 | 9/1982 | (GB) . |
| 2140824 | 12/1984 | (GB) . |

* cited by examiner

*Primary Examiner*—Donald R. Valentine
(74) *Attorney, Agent, or Firm*—Ernestine C. Bartlett; Bernard Franzblau

(57) ABSTRACT

An apparatus for electrochemically machining of a workpiece by means of an electrode has an actuator for setting a gap between the electrode and the workpiece. The apparatus further has a channel for flushing the gap with an electrolyte and a container for containing the electrolyte. Power cords and are provided for feeding an electric current I supplied by a power supply through the electrolyte in the gap. Near the gap an antenna is provided to pick up electromagnetic waves radiated from the gap. The antenna is connected to a band-pass filter which passes signals in a frequency band of 40 to 100 MHz to a level detector. The level detector compares the amplitude of the filtered signal with a threshold value and supplies a stop signal to the control unit when the amplitude exceeds the threshold value. The control unit is programmed to open a switch in the power supply in response to the stop signal. The antenna, the band-pass filter, the level detector and the control unit together form a damage prevention system which can be used in an existing ECM set-up to prevent spark discharges.

24 Claims, 3 Drawing Sheets

METHOD AND APPARATUS FOR ELECTROCHEMICALLY MACHINING A WORKPIECE

BACKGROUND OF THE INVENTION

The invention relates to a method of electrochemically machining a workpiece by means of an electrode, said method comprising the steps of:
setting a gap between the electrode and the workpiece, which gap is filled with an electrolyte,
feeding an electric current through the electrolyte in the gap via the electrode and the workpiece in order to machine the workpiece,
generating a measurement signal comprising information about possible sparks in the gap, and
protecting the electrode and/or the workpiece against damage by reducing the current when a parameter of the measurement signal exceeds a certain threshold value.

The invention further relates to an apparatus for electrochemically machining a workpiece by means of an electrode, said apparatus comprising:
an actuator for setting a gap between the electrode and the workpiece,
fluid transport means for flushing the gap with an electrolyte,
power supply means for feeding an electric current through the electrolyte in the gap via the electrode and the workpiece in order to machine the workpiece, and damage prevention means comprising
measurement means for generating a measurement signal comprising information about partial discharge precursors of spark discharges in the gap,
detection means for generating a stop signal when a parameter of the measurement signal exceeds a threshold value, and
reduction means for reducing said current upon detection of said stop signal.

The invention also relates to a damage prevention means comprising
measurement means for generating a measurement signal comprising information about premonitory phenomena of partial spark discharges in an inter-electrode gap,
detection means for generating a stop signal when a parameter of the measurement signal exceeds a threshold value, and
reduction means for reducing said current upon detection of said stop signal.

Such a method, apparatus and damage prevention means are known from GB 2 140 824. The known method is applied in an apparatus for electrochemically machining (ECM) a workpiece with an electrode. According to this method a gap is set between the electrode and the workpiece. This gap is filled with an electrolyte and a current from a power supply is fed through the electrolyte via the electrode and the workpiece. In order to prevent the generation of an electric arc across the gap, individual spark discharges are detected by means of an electric circuit connected to the electrode and the workpiece. The electric circuit comprises filter means to distinguish noise caused by spark discharges from noise generated by the power supply. Upon detection of spark discharges the power supply is disabled and damage due to an electric arc is prevented. A disadvantage of the known method, apparatus and damage prevention means is that the spark discharges themselves also damage the electrode and the workpiece. Especially when the inter-electrode gap is smaller than 50 micrometers, spark discharges should be prevented because the resulting damage may require replacement of the electrode.

SUMMARY OF THE INVENTION

It is an object of the invention to reduce the risk of damage to the electrode and/or the workpiece. To this end, the method according to the invention is characterized in that the measurement signal is generated by means of an antenna for detecting HF electromagnetic waves originating from the gap. Due to this measure the measurement signal contains information about the onset of spark discharges. By reducing the current upon detection of this information, the occurrence of spark discharges is counteracted so that the risk of damage is reduced.

The invention is based on the insight that at the onset of a spark discharge, partial discharges occur in an intermediate layer within the gap. Such an intermediate layer may be a passivation layer on the anode, a bubble layer of hydrogen gas on the cathode or a bubble layer of oxygen gas on the anode. Such an intermediate layer has a low conductivity compared to the electrolyte so that almost the entire gap voltage appears across the intermediate layer. Such an intermediate layer has a thickness which is only a part of the gap width so that the electric field strength resulting from the gap voltage can be so high that a partial discharge occurs in this intermediate layer. Such partial discharges cause a local heating of the electrolyte so that a gas bubble is formed. If the volume of gas generated is sufficient it can form an insulating bridge between the electrode and the workpiece and through an avalanche effect a spark discharge between the electrode and the workpiece will result. Thus, it can be understood that the partial discharges are precursors of a spark discharge. It has been found that the partial discharges cause far less damage than the spark discharges. In addition, it has been found that these partial discharges result in HF electromagnetic waves which can be detected with an antenna. Thus, by monitoring electromagnetic waves with such an antenna and reducing the current upon detection of electromagnetic waves corresponding to partial discharges, damage of the electrode and/or the workpiece can be counteracted. As a result, a smaller gap width can be applied resulting in an improved machining speed and accuracy.

It is to be noted that measurement of sparks with an antenna is known from GB 2 095 153. However, this measurement is applied in an electric discharge machine (EDM) which is intended for generating spark discharges recurring at a frequency of 10 to 30 MHz. In such an EDM machine the gap phenomena are completely different and there is no mention of partial discharges. The antenna is used to generate a signal that indicates the frequency and amplitude of the spark discharges and not to detect partial discharges that precede a spark discharge.

A parameter which is suitable and can easily be monitored is, for example, the amplitude of the measurement signal after having been filtered by a band-pass filter which transmits a high frequency band. By filtering the lower frequencies it is avoided that, for example, the mains frequency interferes with the detection of partial discharges.

In an industrial environment there are usually many machines which radiate HF bursts by switching large currents on and off. If these HF bursts are picked up by the antenna this could lead to so called 'false alarms'. In order to reduce the risks of 'false alarms' it is preferred to monitor the amount of energy in a high frequency band of the measurement signal.

The threshold value for the monitored parameter corresponding to a partial discharge can easily be determined by an experiment in which spark discharges are produced deliberately and in which the measurement signal is observed in a time slot preceding the occurrence of a spark. This will be elucidated hereafter in the description with reference to the drawings.

The apparatus and the damage prevention means according to the invention are characterized in that the measurement means comprises an antenna for detecting HF electromagnetic waves originating from the gap.

The embodiment of the invention wherein the antenna is electrically isolated from the electrode and the workpiece has the advantage that HF noise present on the power cords connected to the electrode and/or the workpiece is not directly coupled to the antenna so that the quality of the detection is improved.

The embodiment of the invention wherein the antenna is a dipole antenna has the advantage that the antenna can be positioned outside the working area so that the electrode and the workpiece can easily be accessed and changed without obstruction by the antenna.

The embodiment of the invention wherein the antenna is a loop antenna positioned around the gap has the advantage that the antenna is very sensitive to electromagnetic waves originating from discharges in the gap and is less sensitive to interfering electromagnetic waves from the environment.

The embodiment of the invention wherein the detection means comprise a band-pass filter followed by a level detector to detect the level of the measurement signal in a frequency band between 10 and 100 MHz has the advantage that it results in a good price-performance ratio. Equipment for measuring in this frequency band is readily available at relatively low cost. The electromagnetic waves resulting from partial discharges also contain frequency components above 100 MHz. However, it suffices to detect frequency components below 100 MHz.

The damage prevention means according to the invention are characterized in that the measurement means comprises an antenna for detecting HF electromagnetic waves originating from the inter-electrode gap.

BRIEF DESCRIPTION OF THE DRAWING

The invention will now be described in more detail, by way of example, with reference to the drawings, in which.

DESCRIPTION OF THE PREFERRED EMBODIMENTS

Figure 1:
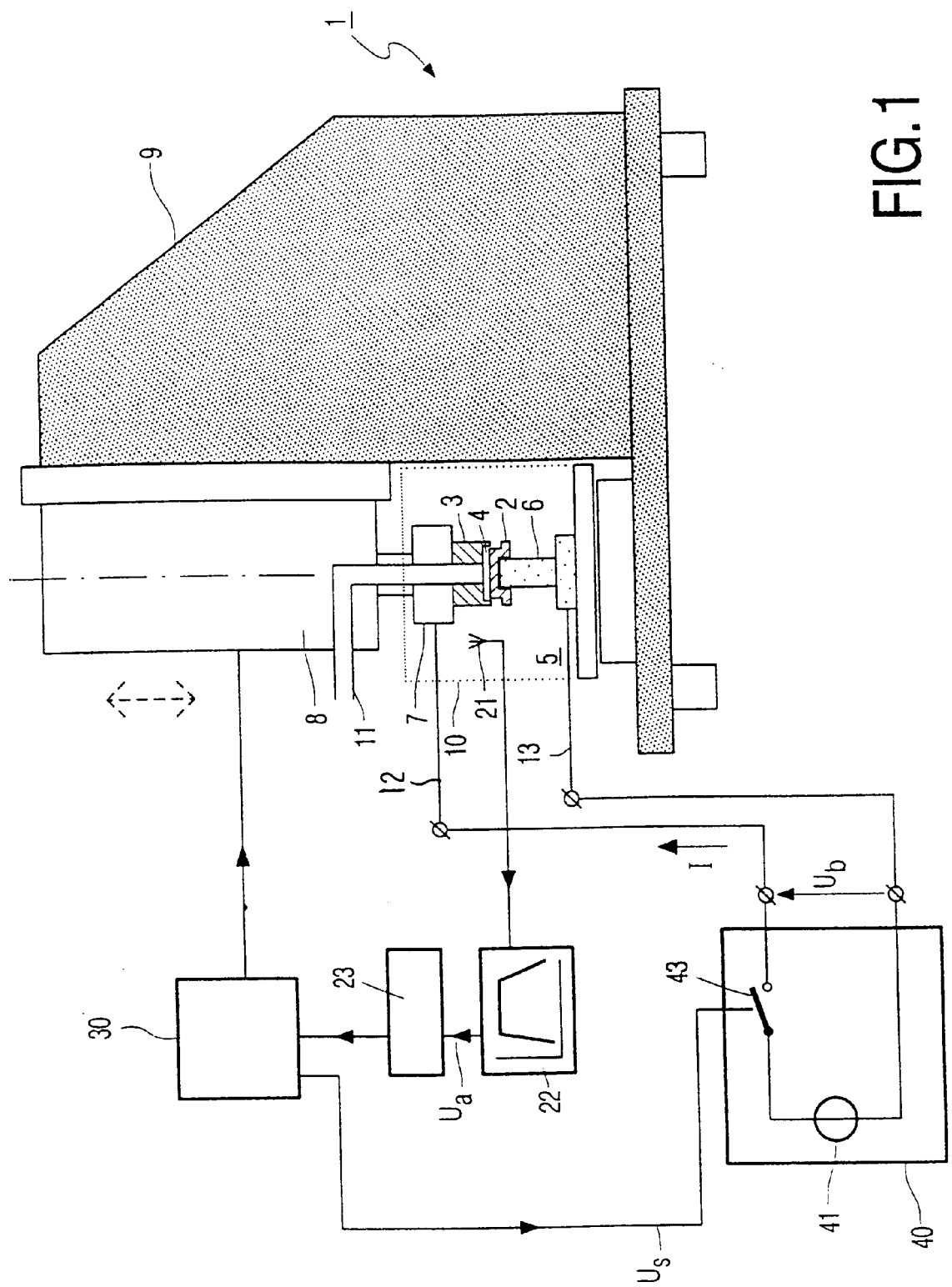
FIG. 1 shows a first embodiment of the apparatus according to the invention.

FIG. 1 shows a first embodiment of the apparatus according to the invention. The apparatus 1 is an apparatus for Electro Chemical Machining of a workpiece 2 by means of an electrode 3. The apparatus 1 has an actuator 8 for setting a gap 4 between the electrode 3 and the workpiece 2. The apparatus further has a fluid transport means in the form of a channel 11 for flushing the gap 4 with an electrolyte 5 and a container 10 for containing the electrolyte 5. In this case the electrolyte consists of a solution of 2–25% $NaNO_3$ in water. Power supply means in the form of power cords 12 and 13 are provided for feeding an electric current I supplied by a power supply 40 through the electrolyte in the gap 4 via the electrode 3 and the workpiece 2 in order to machine the workpiece 2. Near the gap 4 an antenna 21 is provided to pick up electromagnetic waves radiated from the gap 4. The antenna 21 is connected to a band-pass filter 22 which passes signals in a frequency band of 40 to 100 MHz to a level detector 23. The level detector 23 compares the amplitude of the filtered signal Ua with a threshold value and supplies a stop signal Us to the control unit 30 when the amplitude exceeds the threshold value. The control unit 30 is programmed to open a switch 43 in the power supply 40 in response to the stop signal Us. The antenna 21, the band-pass filter 22, the level detector 23 and the control unit 30 together form a damage prevention system which can be used in an existing ECM set-up.

The antenna 21 is positioned within the container 10 and is submersed in the electrolyte 5. Since the electrolyte 5 has a low conductivity, the antenna 21 is practically isolated from the electrode 4 and the workpiece 2 so that the power supply 40 is decoupled from the antenna 21 and noise generated by the power supply 40 and other noise picked up by the power cords 12 and 13 is not transmitted to the band-pass filter 22.

Figure 2:
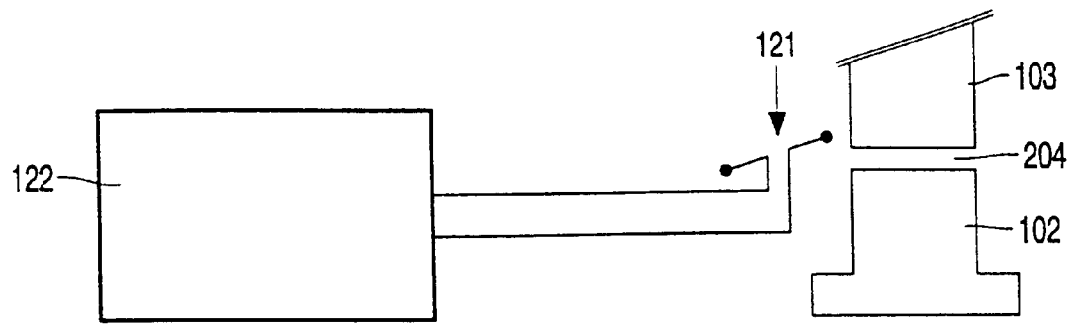
FIG. 2 shows a dipole antenna in a second embodiment of the invention.

FIG. 2 shows a dipole antenna in a second embodiment of the invention. The dipole antenna 121 is positioned beside an inter-electrode gap 204 between an electrode 103 and a workpiece 102 and is directed so as to have optimal reception of electromagnetic waves originating from the gap 204. Optionally, the antenna 121 is shielded for electromagnetic waves coming from positions other than the gap 204. The antenna 121 is connected to a microprocessor unit 122 which samples the antenna signal and calculates the energy of the sampled signal in a frequency band ranging from 10 to 20 MHz during time slots of 1 microsecond. When the calculated energy exceeds a certain threshold value the microprocessor unit 122 supplies a stop signal to a power supply as shown in FIG. 1.

Figure 3:
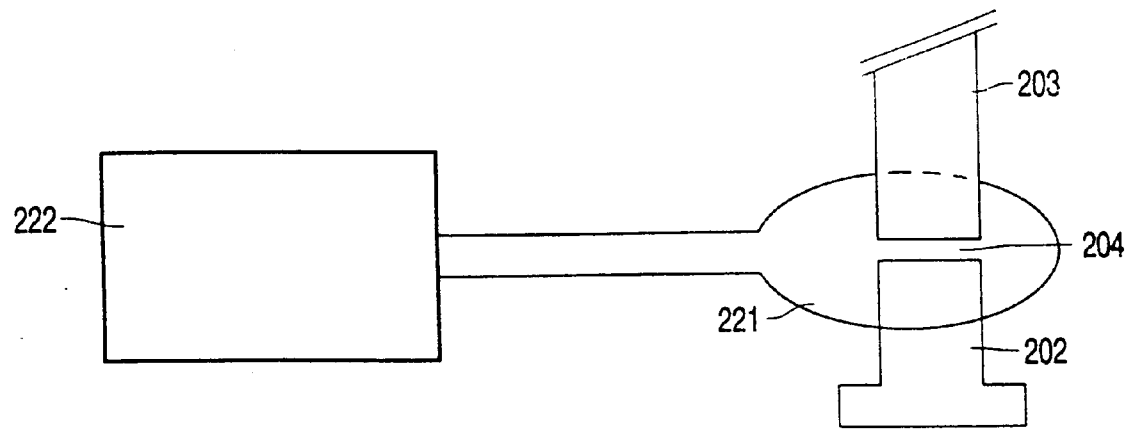
FIG. 3 shows a ring antenna in a third embodiment of the invention and FIG. 4 shows the filtered antenna signal Ua and the voltage across the gap Ub as function of time t before and during the occurrence of a spark discharge.

FIG. 3 shows a ring antenna in a third embodiment of the invention. The ring antenna 221 is positioned around a gap 204 between an electrode 203 and a workpiece 202. The ring antenna 221 is connected to a band-pass filter 222 passing frequency components ranging from 35 to 45 MHz. The other parts in this embodiment are similar to those described with reference to FIG. 1.

Figure 4:
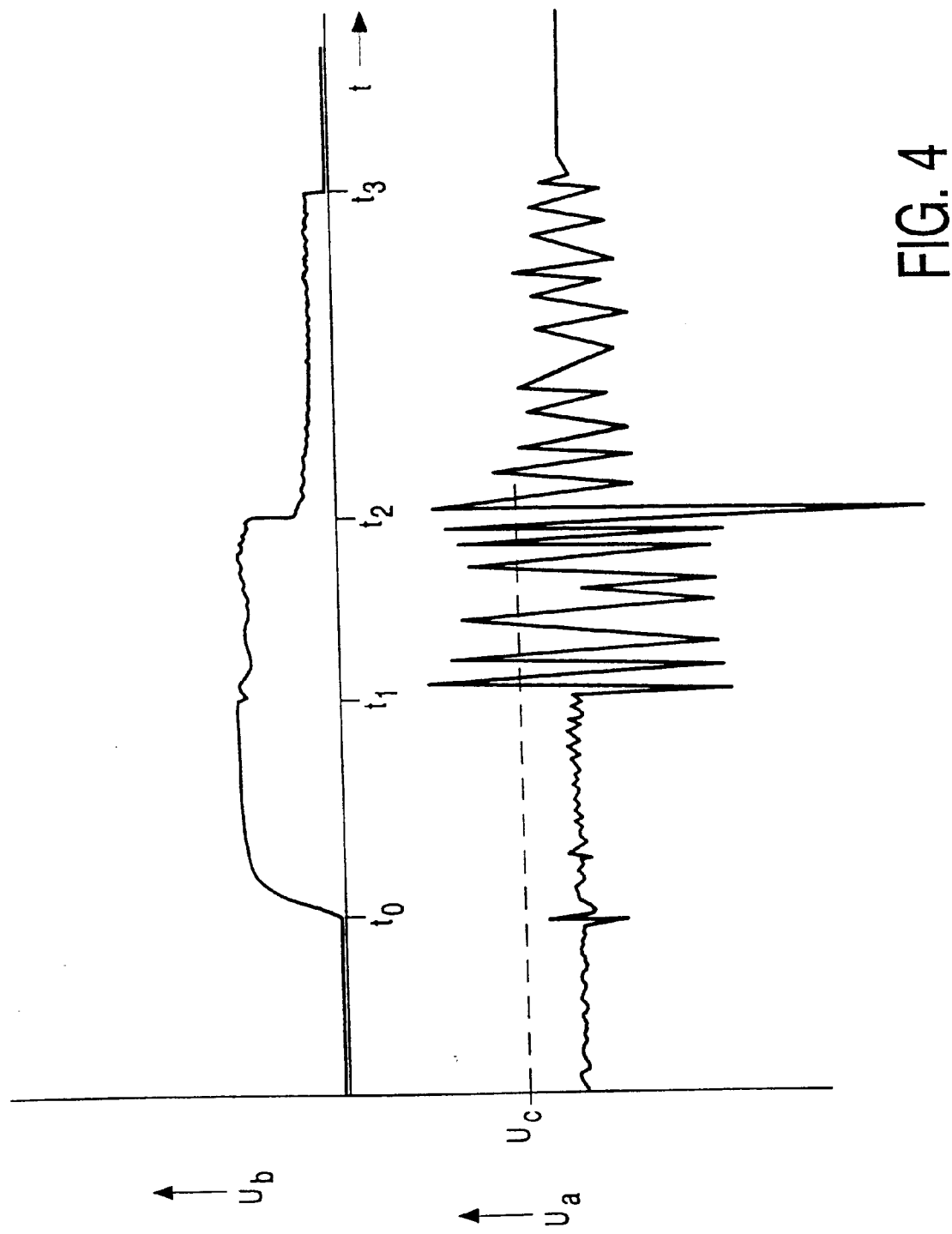

FIG. 4 shows the filtered antenna signal Ua and the voltage across the gap Ub as a function of time t before and during the occurrence of a spark discharge. Such a spark discharge can, for example, be generated in an experiment by reducing the flow of electrolyte so that more gas bubbles are formed in the gap. At $t=t_0$ the switch 43 in power supply 40 is switched on (see FIG. 1) and a voltage Ub is applied across the gap 4 between the electrode 3 and the workpiece 2. Between $t=t_1$ and $t=t_2$ the antenna signal Ua exhibits an HF component which is caused by partial discharges in the inter-electrode gap 4. Between $t=t_2$ and $t=t_3$ the voltage Ub across the gap 4 collapses as a result of numerous spark discharges, resulting in the electrode 3 being welded to the workpiece 2 at $t=t_3$, as a result of which a short circuit occurs and the voltage Ub decreases to zero. The amplitude of the signal Ua clearly remains below a threshold value Uc during normal ECM operation as shown between $t_0$ and $t_1$, and clearly exceeds the threshold value Uc when partial discharges occur in the gap 4 between $t_1$ and $t_2$. It has been found that, dependent on process parameters such as gap width, flow rate of electrolyte 5 through the gap 4 etc., the period between $t_1$ and $t_2$ can be as much as 30 microseconds. This relatively long period suffices to switch off the power supply so that actual sparking and damage to the electrode 3 and/or the workpiece 2 can be prevented. It can also clearly be seen from FIG. 4 that although some noise is detectable on the voltage Ub during the occurrence of partial discharges, the antenna signal Ua gives a far better indication of the onset of a spark discharge and, consequently, the method and apparatus according to the invention offer a large improvement in the art of ECM.

It is to be noted that the invention is not limited to the embodiments shown herein. Various other embodiments are possible within the scope of the invention. For example, it is possible to use a pulsed power supply and/or to use another electrolyte such as a solution of NaCl in water. Moreover, other suitable antenna geometries may easily be obtained by experiment, and other ways of reducing the current through the gap in response to the stop signal may be applied.

What is claimed is:

1. A method of electrochemically machining a workpiece by means of an electrode, said method comprising the steps of:

setting a gap between the electrode and workpiece, which gap is flushed with an electrolyte, feeding an electric current through the electrolyte in the gap via the electrode and the workpiece in order to machine the workpiece, generating a measurement signal by means of an antenna for detecting HF electromagnetic waves originating from the gap, the HF electromagnetic waves comprising information about partial discharge precursors of spark discharges in the gap, and protecting the electrode and/or the workpiece against damage by reducing the current when a parameter of the measurement signal exceeds a certain threshold value.

2. A method according to claim 1, wherein said parameter is the amplitude of the measurement signal in a high frequency band.

3. A method according to claim 1, wherein said parameter is the amount of energy in a high frequency band.

4. A method according to claim 1 which further comprises, determining the threshold value from observations of the measurement signal in a time slot preceding the occurrence of a spark discharge.

5. An apparatus for electrochemically machining a workpiece by means of an electrode, said apparatus comprising:

an actuator for setting a gap between the electrode and the workpiece, a fluid transport for flushing the gap with an electrolyte, a power supply for feeding an electric current through the electrolyte in the gap via electrode and the workpiece in order to machine the workpiece and a damage prevention system comprising an antenna for detecting HF electromagnetic waves originating from the gap and comprising information about partial discharge precursors of spark discharges in the gap, means for generating a measurement signal based upon said information about partial discharge precursors, a detector for generating a stop signal when a parameter of the measurement signal exceeds a threshold value, and a control unit for reducing said current upon detection of said stop signal.

6. An apparatus according to claim 5, wherein the antenna is electrically isolated from the electrode and the workpiece.

7. An apparatus according to claim 5, wherein the antenna is a dipole antenna.

8. An apparatus according to claim 7 wherein the detector comprises a band-pass filter having a pass band between 10 MHz and 20 MHz followed by a level detector to detect the level of the measurement signal in said pass band.

9. An apparatus according to claim 5, wherein the antenna is a loop antenna positioned around the gap.

10. An apparatus according to claim 8 wherein the detector comprises a band-pass filter having a pass band between 35 MHz and 45 MHz followed by a level detector to detect the level of the measurement signal in said pass band.

11. An apparatus according to claim 5 wherein the detector comprises a band-pass filter having a pass band between 40 MHz and 100 MHz followed by a level detector to detect the level of the measurement signal in said pass band.

12. A damage prevention system comprising an antenna for generating a measurement signal comprising information about partial discharge precursors of spark discharges in an inter-electrode gap present between an electrode and a workpiece, a detector for generating a stop signal when a parameter of the measurement signal exceeds a threshold value, and a control unit for reducing said current upon detection of said stop signal, wherein said antenna detects HF electromagnetic waves originating from said partial discharge precursors of spark discharges in the inter-electrode gap.

13. A damage prevention system as claimed in claim 12, wherein the antenna is electrically isolated from the electrode and the workpiece.

14. A damage prevention system as claimed in claim 12, wherein the antenna is a dipole antenna.

15. A damage prevention system as claimed in claim 12, wherein the antenna is a loop antenna positioned around the gap.

16. An apparatus according to claim 12 wherein the detector comprises a band-pass filter having a frequency pass band between 10 MHz and 100 MHz and followed by a level detector to detect the level of the measurement signal in said frequency pass band.

17. An apparatus for electrochemically machining a workpiece by means of an electrode, said apparatus comprising:

an actuator for setting a gap between the electrode and the workpiece, a channel for flushing the gap with an electrolyte suitable for electrochemically machining a workpiece and a container adapted to contain said electrolyte, a power supply for feeding an electric current through the electrolyte in the gap via the electrode and the workpiece at a level to electrochemically machine the workpiece, and a damage prevention system comprising (1) an antenna for generating a measurement signal comprising information about partial discharge precursors indicative of the onset of spark discharges in the gap, (2) a detector system coupled to said antenna for generating a stop signal when a parameter of the measurement signal exceeds a threshold value, and (3) a control unit for reducing the current in response to said stop signal.

18. An apparatus as claimed in claim 17, wherein the antenna is electrically isolated from the electrode and the workpiece.

19. An apparatus according to claim 17, wherein the antenna is a dipole antenna.

20. An apparatus according to claim 17, wherein the antenna is a loop antenna positioned around the gap.

21. An apparatus for electrochemically machining a workpiece by means of an electrode, said apparatus comprising:
- an actuator for setting a gap between the electrode and the workpiece,
- a fluid transport for flushing the gap with an electrolyte,
- a power supply for feeding an electric current through the electrolyte in the gap via the electrode and the workpiece in order to machine the workpiece and
- a damage prevention system comprising
  - an antenna for detecting HF electromagnetic waves originating from the gap and comprising information about premonitory phenomena of partial spark discharges in the gap,
  - means for generating a measurement signal based upon said information about premonitory phenomena of partial spark discharges,
  - a detector for generating a stop signal when a parameter of the measurement signal exceeds a threshold value, and
  - a control unit for reducing said current upon detection of said stop signal
  - wherein the detector comprises a band-pass filter having a frequency pass band of 10 MHz to 100 MHz followed by a level detector to detect the level of the measurement signal in said frequency band between 10 MHz and 100 MHz.

22. An apparatus for electrochemically machining a workpiece by means of an electrode, said apparatus comprising:
- an actuator for setting a gap between the electrode and the workpiece,
- a channel for flushing the gap with an electrolyte and a container adapted to contain said electrolyte,
- a power supply for feeding an electric current through the electrolyte in the gap via the electrode and the workpiece in order to machine the workpiece, and
- a damage prevention system comprising
  - (1) an antenna for generating a measurement signal comprising information about possible spark discharges in the gap,
  - (2) a detector system connected to said antenna and generating a stop signal when a parameter of the measurement signal exceeds a threshold value, and
  - (3) a control unit for reducing the current in response to said stop signal
  wherein said detector system comprises:
    - a band-pass filter connected to said antenna; and
    - a level detector which receives signals in a frequency band from the band filter, said level detector generating said stop signal when a parameter of the measurement signal exceeds a threshold value, and wherein said control unit reduces the current in response to said stop signal.

23. An apparatus for electrochemically machining a workpiece by means of an electrode, said apparatus comprising:
- an actuator for setting a gap between the electrode and the workpiece,
- a channel for flushing the gap with an electrolyte and a container adapted to contain said electrolyte,
- a power supply for feeding an electric current through the electrolyte in the gap via the electrode and the workpiece in order to machine the workpiece, and
- a damage prevention system comprising
  - (1) an antenna for generating a measurement signal comprising information about possible spark discharges in the gap,
  - (2) a detector system connected to said antenna and generating a stop signal when a parameter of the measurement signal exceeds a threshold value, and
  - (3) a control unit for reducing the current in response to said stop signal
  wherein the detector system comprises a band-pass filter followed by a level detector to detect the level of the measurement signal in a frequency band between 10 and 100 MHz.

24. A damage prevention system comprising
- an antenna for generating a measurement signal comprising information about possible spark discharges in an inter-electrode gap,
- a detector for generating a stop signal when a parameter of the measurement signal exceeds a threshold value, and
- a control unit for reducing said current upon detection of said stop signal,
wherein said antenna detects HF electromagnetic waves originating from the inter-electrode gap and said detector comprises:
- a band-pass filter connected to said antenna; and
- a level detector which receives signals in a frequency band from the band filter, said level detector generating said stop signal when a parameter of the measurement signal exceeds a threshold value, and wherein said control unit reduces the current in response to said stop signal.

* * * * *